(12) United States Patent
Paulides et al.

(10) Patent No.: US 8,550,221 B2
(45) Date of Patent: Oct. 8, 2013

(54) MAGNETIC SPRING, A SPRING AND DAMPER ASSEMBLY, AND A VEHICLE INCLUDING THE SPRING

(75) Inventors: Johannes Jacobus Hubertus Paulides, Waalwijk (NL); André Jean Adolf Vandenput, Hasselt (BE); Lisette Vandenput-Geerdens, legal representative, Hasselt (BE); Bernie G. Van Leeuwen, Nieuwegein (NL); Elena Andreevna Lomonova, Eindhoven (NL)

(73) Assignee: Aktiebolaget SKF, Göteborg (SE)

( * ) Notice: Subject to any disclaimer, the term of this patent is extended or adjusted under 35 U.S.C. 154(b) by 641 days.

(21) Appl. No.: 12/308,641

(22) PCT Filed: Jul. 5, 2006

(86) PCT No.: PCT/NL2006/000335
§ 371 (c)(1),
(2), (4) Date: Dec. 13, 2011

(87) PCT Pub. No.: WO2008/004854
PCT Pub. Date: Jan. 10, 2008

(65) Prior Publication Data
US 2012/0119463 A1    May 17, 2012

(51) Int. Cl.
*F16F 9/06*      (2006.01)
(52) U.S. Cl.
USPC ........................................... 188/267; 267/136
(58) Field of Classification Search
USPC ................. 188/266, 267, 267.1; 310/12, 216, 310/254.1; 267/136
See application file for complete search history.

(56) References Cited

U.S. PATENT DOCUMENTS

| | | | | |
|---|---|---|---|---|
| 4,349,757 A | * | 9/1982 | Bhate | 360/15 |
| 4,924,123 A | * | 5/1990 | Hamajima et al. | 310/15 |
| 5,440,183 A | * | 8/1995 | Denne | 310/12.26 |
| 5,584,364 A | | 12/1996 | Sakita | |
| 5,584,367 A | * | 12/1996 | Berdut | 188/267 |
| 5,947,238 A | * | 9/1999 | Jolly et al. | 188/267.2 |

(Continued)

FOREIGN PATENT DOCUMENTS

| | | |
|---|---|---|
| DE | 2024746 A1 | 12/1971 |
| EP | 0391066 A1 | 10/1990 |

(Continued)

*Primary Examiner* — Christopher Schwartz
(74) *Attorney, Agent, or Firm* — Bryan Peckjian; SKF USA Inc. Patent Department (57) ABSTRACT

Spring having a first part (1) and a second part (2) moveable relative to each other along a longitudinal axis (L), a gap (3) being provided between the first part (1) and the second part (2), the first part (1) being provided with permanent magnets (4,4'), the second part (2) including soft magnetic material, the second part (2) having a variable permeability along the longitudinal axis (L) thereof for a magnetic field provided by the permanent magnets (4,4') of the first part (1), wherein the second part (2), for providing the variable permeability for magnetic field, is provided with at least two teeth (5,5') of soft magnetic material which each face a permanent magnet (4,4') with a facing surface when the first part (1) is in an aligned position relative to the second part (2), the gap extending between the two teeth and the corresponding permanent magnets, wherein, when the first part is moving out of the aligned position relative to the second part along a longitudinal axis, the total area of the facing surfaces varies.

21 Claims, 10 Drawing Sheets

(56) References Cited

U.S. PATENT DOCUMENTS

| | | | |
|---|---|---|---|
| 6,035,980 A * | 3/2000 | Fujita et al. | 188/267 |
| 6,129,185 A * | 10/2000 | Osterberg et al. | 188/267.2 |
| 6,588,554 B2 * | 7/2003 | Fujita et al. | 188/267 |
| 6,917,136 B2 * | 7/2005 | Thornton et al. | 310/254.1 |
| 7,633,189 B2 * | 12/2009 | Iwasa et al. | 310/14 |
| 2005/0023905 A1 * | 2/2005 | Sakamoto | 310/12 |
| 2005/0258705 A1 * | 11/2005 | Berwald et al. | 310/216 |
| 2006/0056993 A1 | 3/2006 | Gombinsky | |

FOREIGN PATENT DOCUMENTS

| | | |
|---|---|---|
| FR | 2415751 A1 | 8/1979 |
| FR | 2586462 A1 | 2/1987 |
| JP | 2004068906 A1 | 3/2004 |

* cited by examiner

MAGNETIC SPRING, A SPRING AND DAMPER ASSEMBLY, AND A VEHICLE INCLUDING THE SPRING

This application is a 371 of PCT/NL2006/000335 filed Jul. 5, 2006

BACKGROUND OF THE INVENTION

1. Field of the Invention

The invention relates to a spring, more particularly to a spring having a stroke along a longitudinal axis and in which permanent magnets are used.

The invention also relates to an assembly of a spring and a damper and to a vehicle having a wheel and a wheel suspension in which a spring according to the invention is integrated.

2. Description of the Prior Art

U.S. Pat. No. 5,584,364 describes a magnetic unit used as a shock absorber or load leveler for a vehicle and having a plurality of groups of permanent magnets arranged in a side-by side relationship.

EP-A-0 391 066 describes an integrated spring system comprising a conventional spring, a magnetic spring and a damper. The magnetic spring has an inner part and an outer part each provided with permanent magnets, whereby the direction of the fields of the inner and outer parts are opposite so that a negative spring stiffness is provided, which, in combination with the conventional spring provides a spring system with a non-linear spring characteristic. The spring stiffness is small around the neutral or aligned position and is large when the spring is compressed further.

In both U.S. Pat. No. '364 and EP'066 the repulsive force of two neighboring permanent magnets, which are oppositely oriented, is used for evoking a spring effect.

SUMMARY OF THE INVENTION

An object of the invention is to provide a spring comprising a combination of hard and soft magnetic materials with which a large spring force response, more specifically increasing or decreasing force with displacement, can be provided while the volume of the spring is relatively small.

To that end, the inventions provides a spring having a first part and a second part moveable relative to each other along a longitudinal axis, at least one gap being provided between the first part and the second part, the first part being provided with permanent magnets of a hard magnetic material, the second part including soft magnetic material, the second part having a variable permeability along the longitudinal axis thereof for a magnetic field provided by the permanent magnets of the first part, wherein the second part, for providing the variable permeability for the magnetic field, is provided with at least two teeth of soft magnetic material which each face a permanent magnet with a facing surface when the first part is in an aligned position relative to the second part, the at least one gap extending between the at least two teeth and the corresponding permanent magnets, wherein, when the first part is moving out of the aligned position relative to the second part along a longitudinal axis, the total area of the facing surfaces varies.

Such a spring uses the so-called reluctance or detent force for evoking the spring force, since the magnetic field produced by the permanent magnets wants to maintain to extend through the path having the highest permeability. When the second part is moved relative to the first part, the permanent magnets which are opposite the teeth are moved relative to the teeth. Consequently, the total area of the surfaces of the permanent magnets facing the surfaces of the teeth varies, hence the area through which the magnetic field passes varies. The reluctance force or detent urges the first and the second part in a position wherein the area of the facing surfaces is maximized.

In view of the fact that the reluctance or detent force is a strong force, a high spring force can be obtained in a relatively small volume. Another new effect is that more or less linear spring force behavior, i.e. constant spring stiffness, is obtained, which even occurs directly around the neutral or aligned position of the first and the second part relative to each other. In normal mechanical springs, a linear behavior is only obtainable around a partly compressed, in case of a compression spring, or partly extended in case of a draw spring. The spring according to the invention provides a force in two directions, i.e. the force is directed such that the first part is urged towards the neutral or aligned position relative to the second part. Conventional mechanical springs have a spring characteristic which extends in the force/displacement-diagram in one quadrant, whereas the spring according to the invention has a spring characteristic which extends in the force/displacement-diagram in two quadrants, i.e. the first and the third quadrant.

In an embodiment of the invention the total area of the facing surfaces is maximal when the first part is in the aligned position relative to the second part and diminishes when the first part is moving out of the aligned position relative to the second part along a longitudinal axis.

In such an embodiment, in the aligned position, the spring force is zero, at least when no other spring force generating devices, such as additional conventional springs are present.

Preferably, the teeth of the second part are interconnected to each other by a base of soft magnetic material. Further, preferably, the permanent magnets are mounted on a base soft magnetic material. In that manner a closed path which is highly permeable to a magnetic field is created so that a closed magnetic field is obtained extending through two neighboring teeth via the base of the second part, the permanent magnets and the base of the first part. The reluctance or detent force which is evoked in such a construction when the first part is moved relative to the second part along the longitudinal axis is very high because the rate of change of permeability with position and because the density of the magnetic field is high.

Preferably, the dimension of a tooth in the longitudinal direction is A, the distance between two sides of two neighboring teeth which sides are directed towards each other is B, and wherein the dimension of a permanent magnet in the longitudinal direction is C, wherein $A \geq (B$ or $C)$. In such an embodiment, a permanent magnet corresponding to a first tooth will not interfere with a neighboring tooth, at least not when the spring stroke is kept within the boundaries set for the spring.

An optimal relation between spring volume and stroke length is obtained in the last described embodiment when $A=B$ and $A \geq C$. With such a spring, the spring has a stroke in the direction of the longitudinal axis, wherein the length of the stroke is A. In the center of the stroke, the first part is in the aligned position relative to the second part and the spring force is equal to zero. When the moveable one (the mover) of the first and the second part is moved out of the aligned position, the spring force is directed along the longitudinal axis so that the mover is urged to the aligned position.

In an embodiment of the invention the surface of a tooth facing a facing surface of a corresponding permanent magnet is shaped according to a curve to obtain a desired spring force characteristic along the longitudinal axis when the first part moves relative to the second part from the aligned position to a non-aligned position.

By shaping the teeth, the force/displacement-characteristic can be influenced. Embodiments of this principle are e.g.:
- a spring wherein the teeth are block shaped so that the tooth facing a facing surface of a corresponding permanent magnet is straight and parallel to the longitudinal axis; or
- the teeth are saw tooth shaped so that the tooth facing a facing surface of a corresponding permanent magnet defines a triangular tooth; or
- the tooth facing a facing surface of a corresponding permanent is defined by a circular segment, be it convex or concave relative to the permanent magnet.

In an embodiment of the invention at least one of the first and second parts is provided with a coil which is connectable to a electric source for creating a magnetic field which counteracts the magnetic field created by the permanent magnets or which adds to the magnetic field created by the permanent magnets, therewith influencing the spring force/displacement-characteristic of the spring.

Generally, although not limited to, the electric source will be a DC-source. The great virtue of this embodiment is that spring force/displacement-characteristic can be influenced by varying the current supplied to the DC-source. This variation can be done very rapidly, i.e. with a very high frequency, and a very small response time. Consequently, when the spring is used in e.g. a vehicle suspension, the spring force generated by the spring can, at any moment, be varied to adapt the desired spring force to the actual circumstances of the moment. The spring in this embodiment can be given an active spring behavior.

From a constructional point of view it is preferable when the coil is integrated in the stationary one, the stator, of the first and the second part.

In a further elaboration of the active spring embodiment, the source is connected to a control for controlling the current delivered by the source and, consequently, for controlling the spring force/displacement-characteristic of the spring. Preferably, the control is adapted for varying the current of the source continuously, so that the spring force is continuously variable in any stroke position at any moment. The spring force can be increased by controlling the electric source to create a magnetic filed which adds to the magnetic field created by the permanent magnets and can be decreased by controlling the electric source to create a magnetic field with the coil which counteracts the magnetic field created by the permanent magnets. Such current variation can be effected at any moment and at any relative position of the first part relative to the second part.

In order to provide a spring with a certain volume envelope which can exert a higher spring force, an embodiment of the invention provides a spring wherein multiple gaps are provided between the first and the second part, each gap being bounded by at least two teeth and two permanent magnets each one corresponding to one of said two teeth.

A practical embodiment could be an inner cylinder and an outer hollow cylinder which are stationary and which carry the teeth and an intermediate hollow cylinder extending between the inner and the outer cylinders, carrying the permanent magnets both on its inner and its outer surface.

In order to provide a spring with a certain volume envelope which can exert a higher spring force, an embodiment of the invention provides a spring, wherein, viewed in the direction of the longitudinal axis in a gap more than two teeth are provided on the second part and a corresponding number of permanent magnets is provided on the first part.

In order to provide a spring with a certain volume envelope which can exert a higher spring force, an embodiment of the invention provides a spring, wherein the second part is provided with hard magnetic material at least between two neighboring teeth and downstream of the last tooth seen in the stroke direction, the hard magnetic material having an orientation such that a repulsive force between that hard magnetic material and the permanent magnets of the first part is evoked when the first part is moved out of the aligned position relative to the second part.

In this embodiment the reluctance or detent force—which reluctance force occurs when the facing surfaces of the permanent magnets are moved away from the facing surfaces of the teeth by the relative movement of the first part and the second part along the longitudinal axis—is combined by the repulsive force which is evoked between the hard magnetic material on the second part and the permanent magnets of the first part.

Consequently, the spring force is both determined by the reluctance force and said repulsive force. This provides a spring with a higher spring characteristic within a certain volume envelop.

The invention also provides an assembly of a spring of one of the preceding claims with a damping device. The damping device can be a separate device from the spring or can be integrated in the spring.

The invention also provides a vehicle provided with at least one wheel and a suspension via which the wheel is connected to a chassis of the vehicle, the suspension comprising at least one spring according to the invention. Especially when the spring is of the active type, i.e. comprises a coil which is controlled by a control for influencing the spring characteristic of the spring, an active suspension with a very short response time can be obtained while the spring is rather simple and robust from a constructional point of view.

DETAILED DESCRIPTION OF THE PREFERRED EMBODIMENTS

Figure 1:
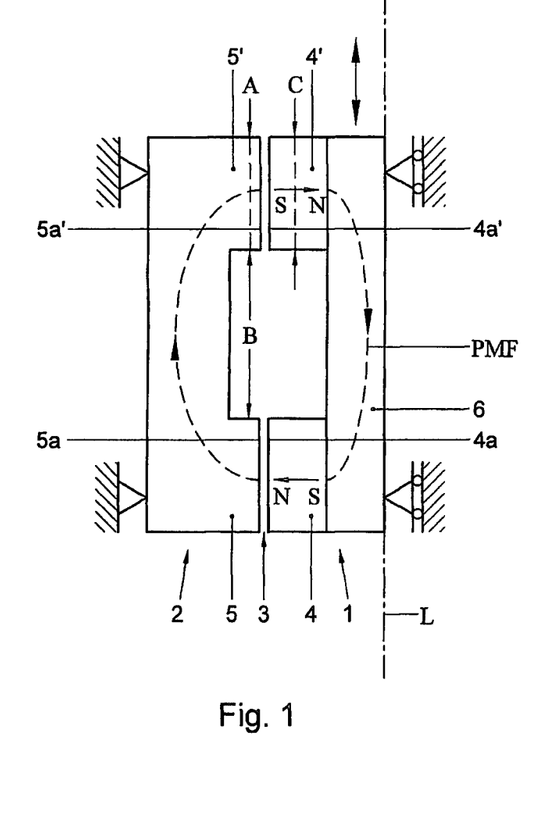
FIG. 1 shows a schematic cross section of a first embodiment of the spring in the aligned or neutral position.
Figure 1A:
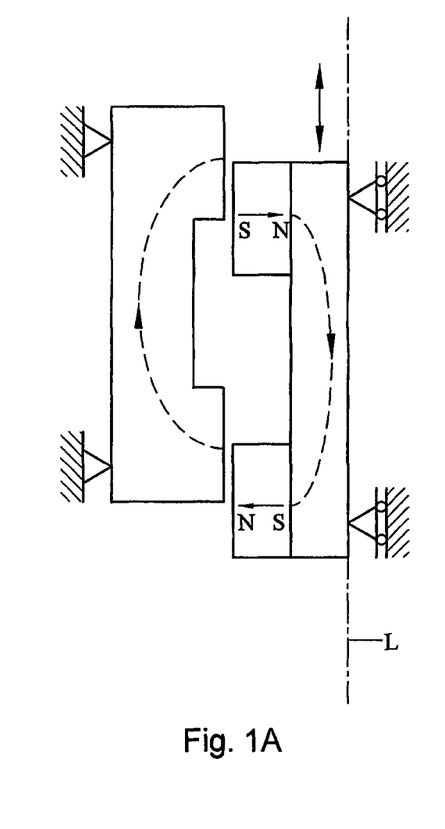
FIG. 1A shows a similar view as in FIG. 1, wherein the first part is moved out of the aligned position relative to the second part.

The embodiment of FIG. 1 shows a spring having a first part 1 and a second part 2 moveable relative to each other along a longitudinal axis L. In this embodiment, the first part 1 is a mover and the second part 2 is a stator. The mover is guided in a guide which can be provided by bearings in a known manner. The bearing can be of various types such as ball bearings, roller bearings, magnetic bearings, fluid bearings, slide bearings or the like. Between the first part 1 and the second part 2, a gap 3 is present. The first part 1 is provided with permanent magnets 4, 4' of a hard magnetic material. In this embodiment, the permanent magnets 4, 4' are mounted on a base 6 of soft magnetic material. The second part 2 includes and is preferably entirely made of soft magnetic material. The shape of the second part 2 is such that it has a variable permeability along the longitudinal axis thereof for the magnetic field (indicated by the dotted line PMF) provided by the permanent magnets 4, 4' of the first part 1. For providing the variable permeability for the magnetic field, the second part 2 is provided with at least two teeth 5, 5' of soft magnetic material which each face a permanent magnet 4, 4' with a facing surface 5a, 5a' when the first part 1 is in an aligned position relative to the second part 2. The facing surfaces 5a, 5a' of each tooth 5, 5' are directed towards a facing surface or pole 4a, 4a' of the corresponding permanent magnets 4, 4'. Neighboring permanent magnets 4, 4' preferably have a opposite magnetic direction. In FIG. 1, the magnetic direction of each magnet 4, 4' is indicated by an arrow in the magnet 4, 4'. The north pole of the magnets 4, 4' is indicated by N and the south pole is indicated by S. The gap 3 extends between the two teeth 5, 5' and the corresponding permanent magnets 4, 4'. When the first part 1 is moving out of the aligned position (shown in FIG. 1) into a non-aligned position (shown in FIG. 1A) relative to the second part 2 along the longitudinal axis L, the total area of the facing surfaces varies. In the embodiment shown in FIG. 1, the total area of the facing surfaces is maximal when the first part 1 is in the aligned position relative to the second part 2 and diminishes when the first part 1 is moving out of the aligned position relative to the second part 2 along the longitudinal axis L.

Figure 3:
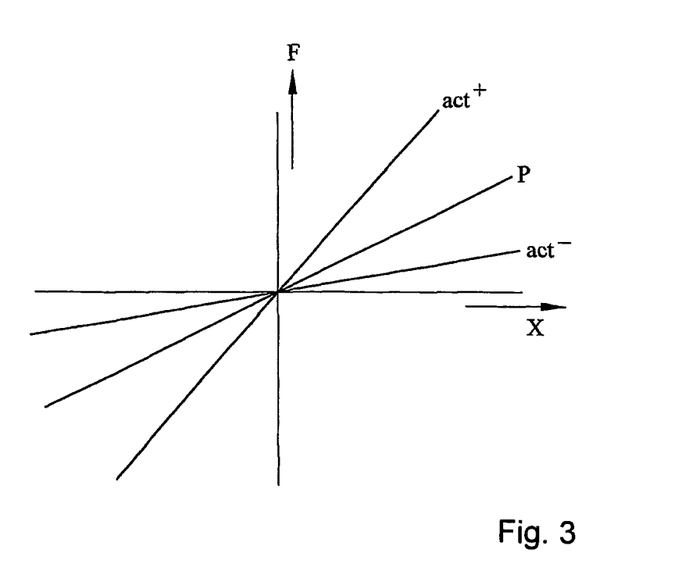
FIG. 3 shows a force/displacement-diagram of an embodiment of the spring.

Due to reluctance or detent force, the first part 1 is urged towards the aligned position, thus providing a spring force in a direction parallel to the longitudinal axis L. For a certain volume envelope of the spring, the proposed solution using reluctance or detent force, provides a relatively high spring force characteristic. The spring has the special feature that it incorporates both a compression spring and a draw spring characteristic. In other words, in a force/displacement-characteristic (see FIG. 3), the spring acts in the first and the third quadrant, whereby the linearity of the spring force/displacement-characteristic around the aligned position is very good. The spring force/displacement-characteristic can be tailored to a desired characteristic. This will be elucidated when referring to FIGS. 8-10.

The dimension of a tooth 5, 5' in the longitudinal direction is indicated by A. The distance between two sides of two neighboring teeth 5, 5' which sides are directed towards each other is indicated by B. The dimensions of the permanent magnets 4, 4' in the longitudinal direction is C. In order to obtain a good spring characteristic it is preferred when A≥(B or C). In those circumstances interference between a permanent magnet with a tooth which does not correspond to that permanent magnet is prevented.

It is even more preferred when A=B and A≥C. For such an embodiment, the spring has a stroke in the direction of the longitudinal axis, wherein the length of the stroke is A.

When, for example, A>C, then movements around the aligned position will not result in the evocation of reluctance forces and, consequently, spring forces. For some applications that can be desired, e.g. when a certain play around a neutral position is desired.

Figure 6:
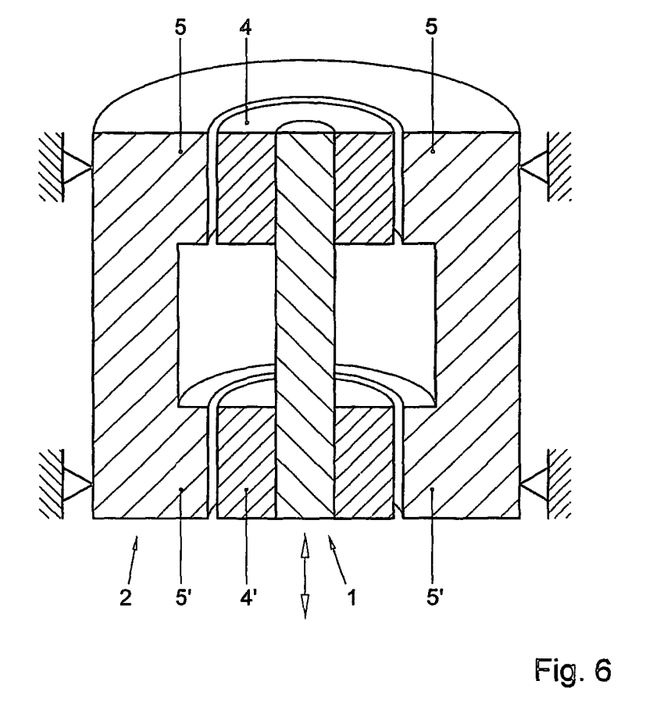
FIG. 6 shows in a perspective cross section a practical embodiment of the embodiment schematically shown in FIG. 1.

A practical embodiment of the embodiment of FIG. 1 is shown in FIG. 6 in which the second part 2 is a hollow, substantially cylindrical part which has the teeth 5, 5' on its inner surface. The first part 1 is a substantially cylindrical part which carries the permanent magnets 4, 4' on its outer surface. It should be noted that the principle embodiment schematically shown in FIG. 1 could also be created in a practical embodiment when the first part 1 and the second part 2 are substantially flat and parallel to each other. Further non-cylindrical embodiments are feasible, e.g. embodiments in which the first and second parts 1, 2 have a substantially rectangular or triangular cross section perpendicular to the longitudinal axis. It should be noted that in stead of the embodiments shown in FIGS. 1-6, the first part carrying the permanent magnets 4, 4' can also be stationary while the second part carrying the teeth 5, 5' is moveable. Such an embodiment is e.g. shown in FIG. 7.

Figure 2:
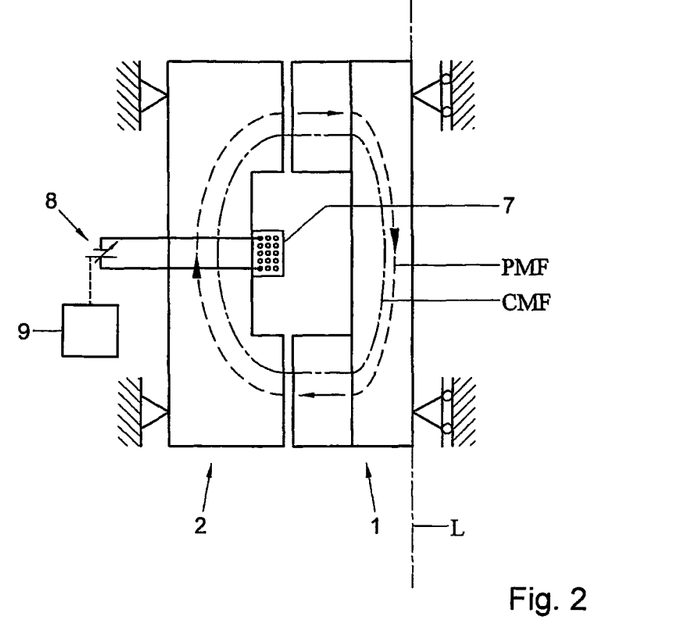
FIG. 2 shows a schematic cross section of a second embodiment of the spring.

FIG. 2 schematically shows a second embodiment in which a coil 7 is added to the second part 1. The coil is connected to a variable electrical source 8 which is controlled by a control 9. The coil 7, of which only one part of the windings is shown in cross section in FIG. 2, produces a coil magnetic field CMF when a current is flowing through the coil. The coil magnetic field can have the same direction as the magnetic field PMF produced by the permanent magnets 4, 4'. In those circumstances the spring force is increased relative to the passive circumstances (no current through the windings of the coil). On the other hand, the coil magnetic field can have the opposite direction as the magnetic field PMF produced by the permanent magnets 4, 4'. In those circumstances the spring force is diminished relative to the passive circumstances. The direction of the coil magnetic field CMF is determined by the direction of the current through the windings of the coil. The density of the coil magnetic field is determined by the current level in the coil.

The control 9 is adapted to continuously control and vary when desired the current level and the current direction in the coil 7 and therewith controls the spring force of the spring.

Instead of a single characteristic p in the force/displacement-diagram (see FIG. 3) which would be obtained for a passive spring (i.e. not provided with a coil), an entire spring force area in the first and the third quadrant of the diagram is covered by a single spring. The boundaries of the area are indicated by two lines act+ and act−. At any moment, at any displacement position, the spring force exerted by the spring can be instantaneously adjusted by varying the current in the coil 7. This can be effected at a very high rate with virtually no response time. Thus an active spring is obtained From a constructional point of view it is preferable when the coil is integrated in the stationary one, the stator 2, of the first and the second parts 1, 2 respectively. However, the invention also covers embodiments in which the coil is integrated in the moveable one, the mover 1, of the first and the second parts.

Figure 4:
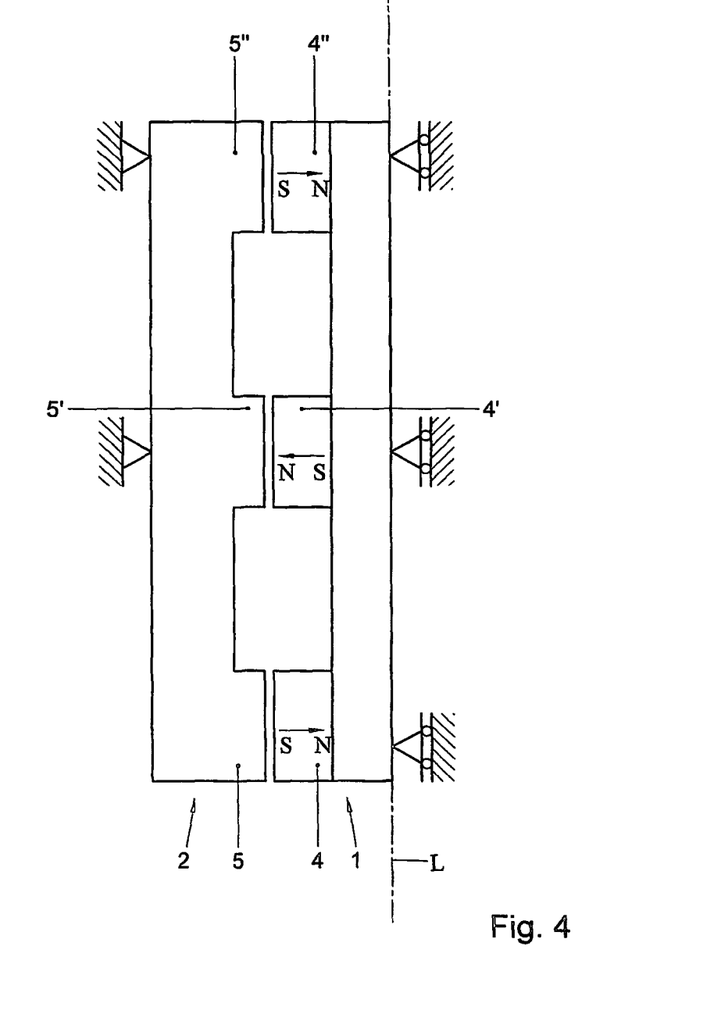
FIG. 4 shows a schematic cross section of a spring with three teeth.

In order to increase the spring force which can be exerted by the spring, embodiments as in FIG. 4 are feasible in which, viewed in the direction of the longitudinal axis in a gap more than two teeth 5, 5', 5" are provided on the second part 2 and a corresponding number of permanent magnets 4, 4', 4" is provided on the first part 1. The embodiment of FIG. 4 shows 3 teeth 5, 5', 5". It will be clear that larger numbers of teeth are also possible.

Figure 5:
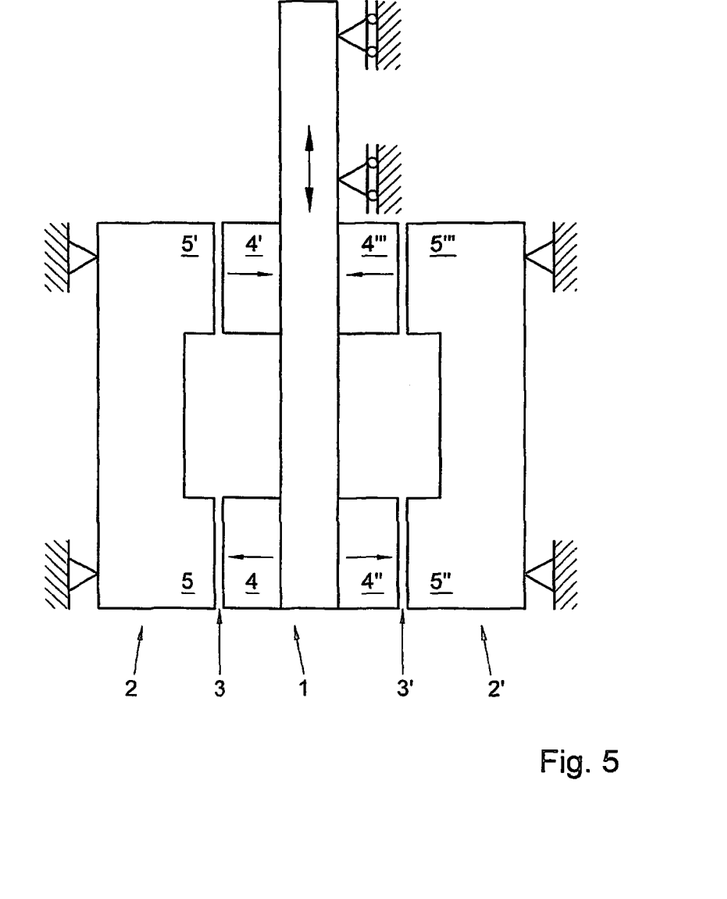
FIG. 5 shows a schematic cross section of a spring with two gaps.
Figure 7:
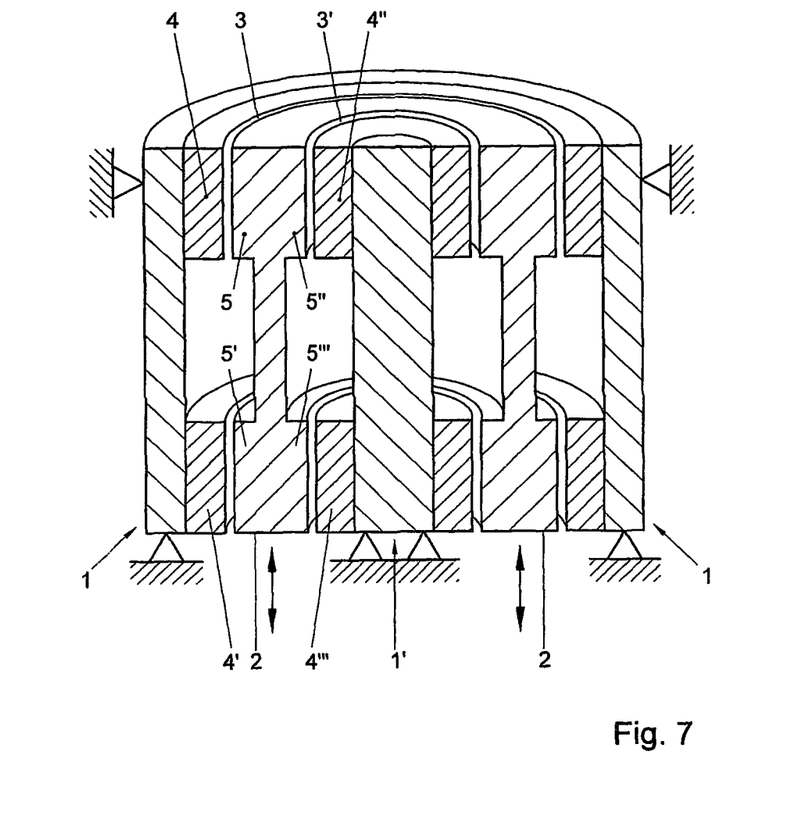
FIG. 7 shows in a perspective cross section a practical embodiment of a spring with two gaps.

Another way to increase the spring force which can be exerted by the spring is shown in FIGS. 5 and 7. In these embodiments, multiple gaps 3, 3' are present.

In the embodiment of FIG. 5, two stationary second parts 2, 2' are present and one moveable first part 1 is present. The first gap 3 is bounded by two permanent magnets 4, 4' and two teeth 5, 5'. The second gap 3' is bounded by two permanent magnets 4", 4'" and two teeth 5", 5'". The spring force is doubled while the length of the construction is still the same.

In the embodiment of FIG. 7, two stationary first parts 1, 1' are present and one moveable second part 2 is present. An outer, substantially hollow cylindrical first part 1 carries permanent magnets 4, 4' on its inner surface. An inner, substantially cylindrical first part 1' carries permanent magnets 4", 4'" on its outer surface. An intermediate second part 2 has a substantially hollow cylindrical configuration and carries teeth 5, 5', 5", 5'" both on its inner and its outer surface.

The force/displacement-characteristic p, can be tailored as mentioned before. This can be done by shaping the curve of facing surface 5a, 5a' of the teeth 5, 5'. The embodiments of FIGS. 1-7 have block shaped teeth so that so that the curve of the facing surfaces 5a, 5a' is straight and parallel to the longitudinal axis L. In such an embodiment, the spring force characteristic is substantially linear, at least around the aligned position. Further away from the aligned position, the spring stiffness will decrease.

Figure 8:
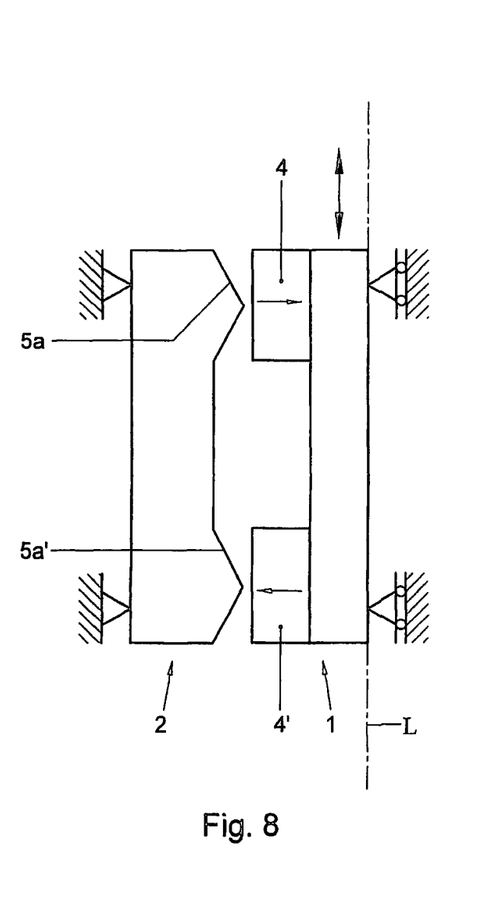
FIG. 8 shows an embodiment in which the teeth have a saw tooth shape.

In the embodiment of FIG. 8, the teeth 5a, 5a' are saw tooth shaped so that the curve defines a triangular tooth. With such a saw tooth shape, the spring force stiffness will decrease quicker with a displacement out of the aligned position than with the block shaped teeth.

Figure 9:
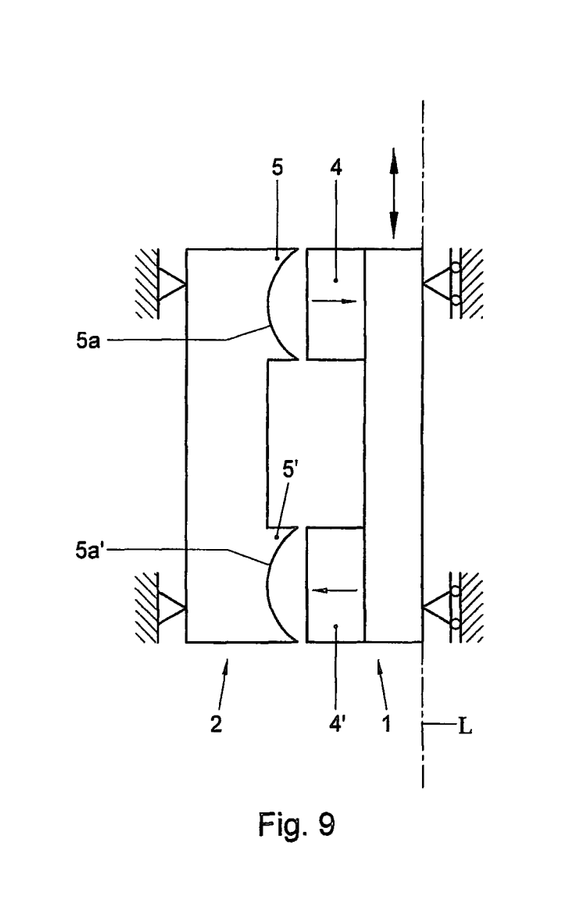
FIG. 9 shows an embodiment in which the teeth have circle segment curve.

In the embodiment of FIG. 9, the curve of the facing surfaces 5a, 5a' of the teeth 5, 5' is defined by a circular segment. The teeth 5, 5' are concave relative to the permanent magnets 4, 4'. In this embodiment, the force/displacement-characteristic of the spring can be tailored. When the circular segments define convex teeth 5, 5' relative to the permanent magnets 4, 4', a behavior is obtained which is similar to that of the embodiment of FIG. 8 with the saw tooth shaped teeth.

By tailoring the teeth a force/displacement-characteristic of a pre-stressed spring can be mimicked, i.e. a small movement directly around the aligned position of the first part relative to the second part directly evokes a spring force. In the force/displacement-diagram this results in a force/displacement-characteristic which does not cross the cross point of the axes but which starts at the force axis above or below the displacement axis.

Figure 10:
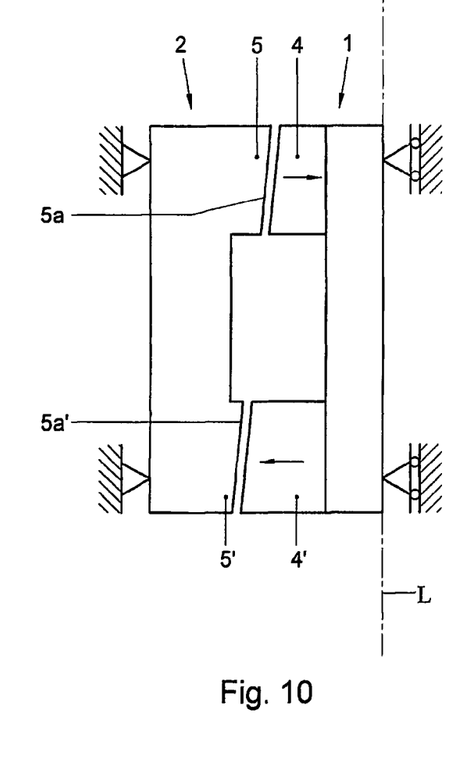
FIG. 10 shows an embodiment in which the teeth taper in the direction of the longitudinal axis.

In the embodiment of FIG. 10, the teeth 5a, 5a' and the permanent magnets 4, 4' taper relative to the longitudinal axis L. Consequently, when the first part 1 displaces downwardly relative to the second part 2 in the longitudinal direction, the width of the gap 3 increases, which causes a tailored spring force/displacement-characteristic different from the embodiments with the block shaped teeth in which the gap width does not change when the mover moves relative to the stator. In the embodiment of FIG. 10 the spring stiffness will decrease quicker when the mover moves away from the aligned position than with embodiments having block shaped teeth.

Of course, it is alternatively or additionally possible to shape the curve of facing surfaces 4a, 4a' of the permanent magnets 4, 4' to tailor the spring force characteristics of the spring.

Figure 11:
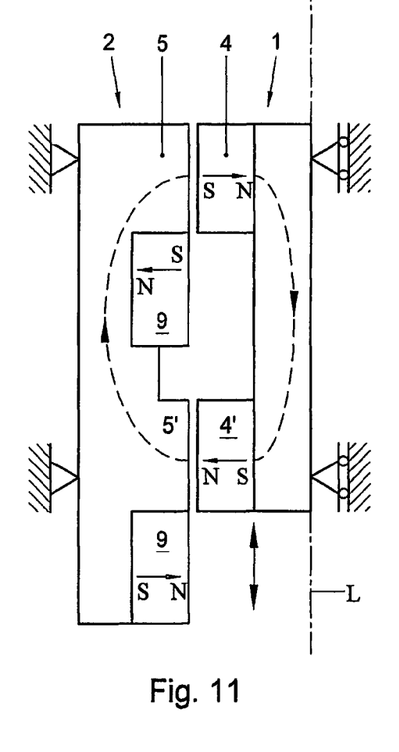
FIG. 11 shows a schematic cross section of an embodiment in which permanent magnets are included in the second part.

In order to increase the exerted spring force without increasing the space volume envelop of the spring the embodiment of FIG. 11 is proposed. In that embodiment, the second part 2 is provided with hard magnetic material 9, 9' at least between two neighboring teeth 5, 5' and downstream of the last tooth 5' seen in the stroke direction. The magnetic direction of the hard magnetic material 9, 9' is such that a repulsive force between that hard magnetic material 9, 9' and the permanent magnets 4, 4' of the first part 1 is evoked when the first part 1 is moved out of the aligned position relative to the second part 2. In this spring the spring force is a combination of the reluctance force—which reluctance force is evoked by the varying facing surface area of the teeth 5, 5' and the permanent magnets 4, 4'—and the repulsive force between the hard magnetic material on the second part 2 and the permanent magnets 4, 4' on the first part 1. Due to this combination of forces a very high spring stiffness within a relatively small volume envelope is provided.

Figure 12:
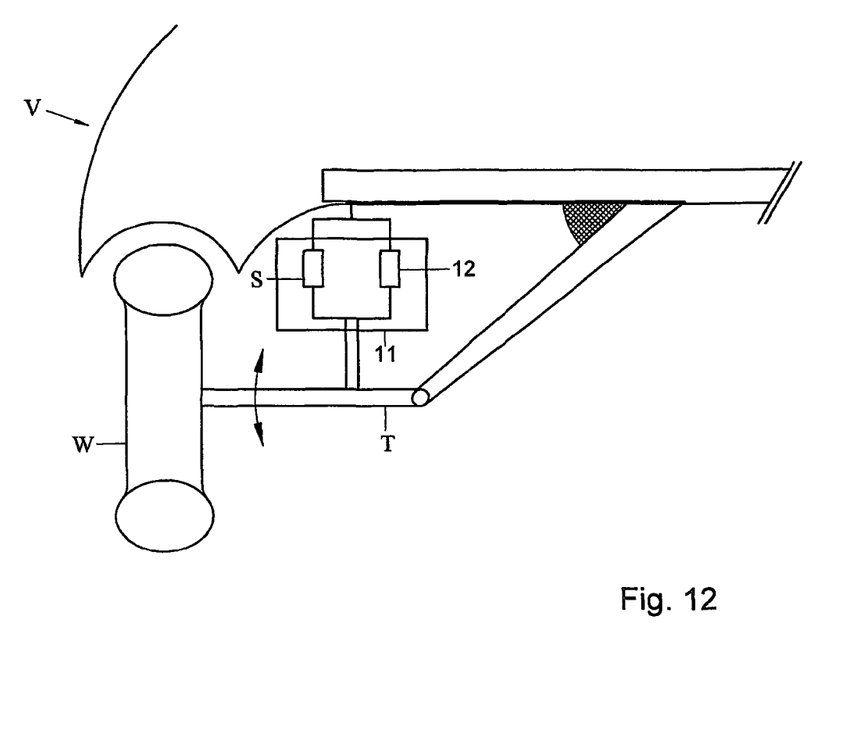
FIG. 12 schematically shows a vehicle with a wheel and a wheel suspension.

FIG. 12 schematically shows a vehicle V with a wheel W and a wheel suspension T. The wheel suspension is provided with a spring S of the type according to the invention. More particularly, the suspension is provided with an assembly 11, comprising a spring S of the type according to the invention and a damper 12. Although depicted separately, the damper 12 can be integrated into the spring S. When the spring S is of the active type as described above, the spring characteristic can be adapted to the driving circumstances of the vehicle V. For example roll can be counter acted in curves, diving of the vehicle during braking can be counter acted and the spring force/displacement characteristic can be adapted to the type of road, the speed and/or the way of driving, i.e. sportive or relaxed and comfortable. All these variations can be effected instantaneously without virtually any response time by means of the control 9 which controls the current level and current direction in the coils 7 of the spring S.

Figure 13:
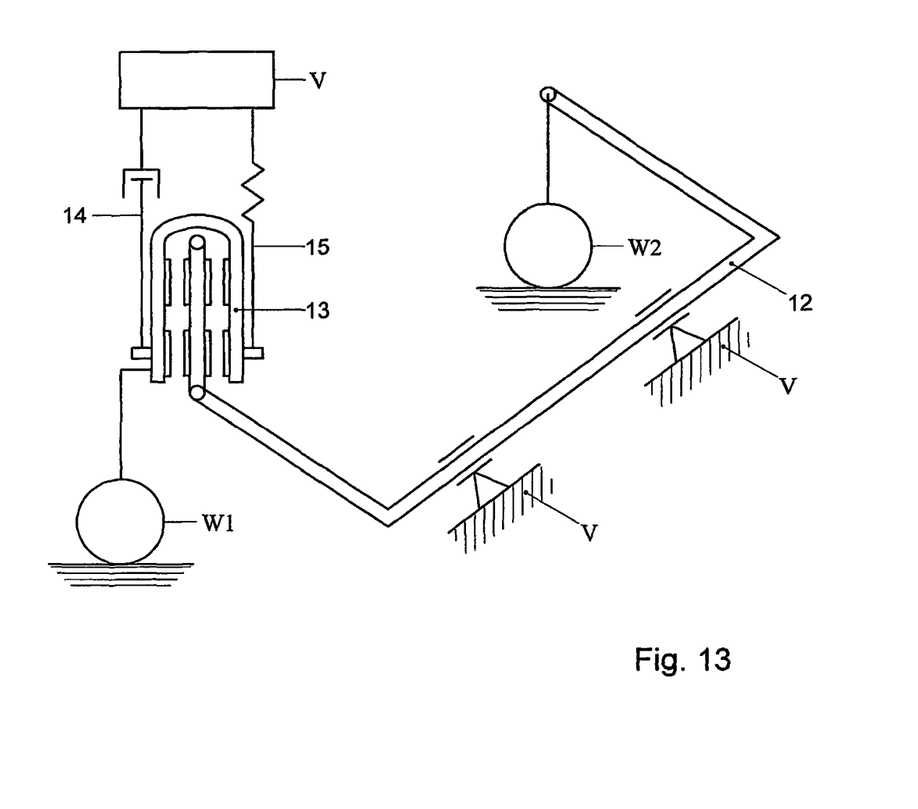
FIG. 13 schematically shows two wheels of a vehicle with an anti roll bar and an embodiment of the spring according to the invention.

FIG. 13 schematically shows an embodiment of a vehicle V provided with a first and a second wheel W1, W2 and an anti roll bar 12. The vehicle comprises anti roll bar spring 13 which is an embodiment of a spring according to the invention and which is connected in series with the anti roll bar 12 between the first and the second wheels W1, W2. Additionally, a damper 14 and a conventional spring 15 or an additional spring according to an embodiment of the invention can be provided for suspension of the each wheel W1, W2. Especially when the anti roll bar spring 13 is of the active type, the roll behavior of the vehicle V can be adapted as desired, e.g. in dependence to the type of road, the speed and/or the way of driving, i.e. sportive or relaxed and comfortable. All these variations can be effected instantaneously without virtually any response time It is clear that the invention is not limited to the embodiments described above but is defined by the appended claims. Combinations of the various embodiments are also feasible. For example a multi gap spring having more than two teeth in each gap and having coils between the neighboring teeth for creating a coil magnetic field is also within the scope of the present invention.

The invention claimed is:

1. A spring comprising:
    a first part and a second part moveable relative to each other along a longitudinal axis, at least one gap being defined between the first part and the second part, the first part including permanent magnets of a hard magnetic material, the second part including a soft magnetic material, the second part having at least two teeth of soft magnetic material which each have a surface facing an adjacent surface of one of the permanent magnets when the first part is in an aligned position relative to the second part, the at least one gap being defined between the at least two teeth and the corresponding permanent magnets, wherein, when the first part moves from the aligned position relative to the second part along the longitudinal axis, the total area of the facing surfaces of the teeth and of the permanent magnets varies such that the magnetic permeability of the second part in response to a magnetic field of the permanent magnets varies along the longitudinal axis.

2. The spring according to claim 1, wherein the total area of the facing surfaces of the teeth and the permanent magnets is maximal when the first part is in the aligned position relative to the second part and diminishes when the first part moves from the aligned position relative to the second part along a longitudinal axis.

3. The spring according to claim 1, wherein the teeth of the second part are interconnected by soft magnetic material.

4. The spring according to claim 1, wherein the permanent magnets of the first part are mounted on a base of soft magnetic material.

5. The spring according to claim 1, wherein a dimension of each tooth in the longitudinal direction is A, each tooth has at least one side facing generally toward another tooth, a distance between the sides of two neighboring teeth is B, and wherein a dimension of each permanent magnet in the longitudinal direction is C, wherein A>(B or C).

6. The spring according to claim 5, wherein A=B and A>C.

7. The spring according to claim 6, wherein the spring has a stroke in the direction of the longitudinal axis, and wherein the length of the stroke is A.

8. The spring according to claim 1, wherein the facing surface of each tooth is shaped according to a curve to obtain a desired spring force characteristic along the longitudinal axis when the first part moves relative to the second part from the aligned position to a nonaligned position.

9. The spring according to claim 8, wherein each tooth is block shaped so that the curve is straight and parallel to the longitudinal axis.

10. The spring according to claim 8, wherein the each tooth is saw tooth shaped so that the curve defines a triangular tooth.

11. The spring according to claim 8, wherein the curve is defined by a circular segment.

12. The spring according to any claim 1, wherein one of the first and second parts is provided with a coil which is connectable to an electric power source and configured to create a magnetic field which influences the spring force characteristic of the spring by one of counteracting the magnetic field created by the permanent magnets and adding to the magnetic field created by the permanent magnets.

13. The spring according to claim 12, wherein the coil is integrated in a stationary one of the first part and the second part.

14. The spring according to claim 12, wherein the electric power source is connected to a control for controlling the current delivered by the source so as to control the spring force characteristic of the spring.

15. The spring according to claim 14, wherein the control is adapted for varying the current of the source continuously so that the spring force is continuously variable in any stroke position of the spring.

16. The spring according to claim 1 wherein multiple gaps are provided between the first part and the second part, each gap being bounded by at least two teeth and two permanent magnets, each one of the permanent magnets corresponding to one of said two teeth.

17. The spring according to claim 1, wherein, more than two teeth are provided on the second part, the teeth being spaced apart along the longitudinal axis, and a corresponding number of permanent magnets is provided on the first part, the more than two teeth and corresponding magnets defining a single gap.

18. The spring according to claim 1, wherein the second part is provided with hard magnetic material located at least between two neighboring teeth and located downstream of a last tooth defined in the stroke direction, the hard magnetic material of the second part being configured such that the magnetic direction of the hard magnetic material is arranged to generate a repulsive force between that hard magnetic material and the permanent magnets of the first part when the first part is moved out of the aligned position relative to the second part.

19. The spring according to claim 1 in combination with a damping device.

20. A vehicle comprising:
a chassis;
at least one wheel; and
a suspension connecting the wheel with the chassis and having at least one spring, including a first part and a second part moveable relative to each other along a longitudinal axis, at least one gap being defined between the first part and the second part, the first part including permanent magnets of a hard magnetic material, the second part including a soft magnetic material, the second part having at least two teeth of soft magnetic material which each have a surface facing an adjacent surface of one of the permanent magnets when the first part is in an aligned position relative to the second part, the at least one gap being defined between the at least two teeth and the corresponding permanent magnets, wherein, when the first part moves from the aligned position relative to the second part along the longitudinal axis, the total area of the facing surfaces of the teeth and of the permanent magnets varies such that the magnetic permeability of the second part in response to a magnetic field of the permanent magnets varies along the longitudinal axis.

21. A vehicle comprising
at least a first wheel and a second wheel,
an anti roll bar, and
anti roll bar spring connected in series with the anti roll bar between the first wheel and the second wheel, the anti roll bar spring including a first part and a second part moveable relative to each other along a longitudinal axis, at least one gap being defined between the first part and the second part, the first part including permanent magnets of a hard magnetic material, the second part including a soft magnetic material, the second part having at least two teeth of soft magnetic material which each have a surface facing an adjacent surface of one of the permanent magnets when the first part is in an aligned position relative to the second part, the at least one gap being defined between the at least two teeth and the corresponding permanent magnets, wherein, when the first part moves from the aligned position relative to the second part along the longitudinal axis, the total area of the facing surfaces of the teeth and of the permanent magnets varies such that the magnetic permeability of the second part in response to a magnetic field of the permanent magnets varies along the longitudinal axis.

* * * * *